United States Patent [19]

Taylor

[11] 4,016,758
[45] Apr. 12, 1977

[54] THERMAL GAUGE PROBE

[76] Inventor: Julian S. Taylor, 8300 SW. 8, Oklahoma City, Okla. 73108

[22] Filed: Sept. 9, 1975

[21] Appl. No.: 611,755

[52] U.S. Cl. .................................. 73/204; 73/295
[51] Int. Cl.² ........................................ G01F 1/68
[58] Field of Search ............................ 73/204, 295

[56] References Cited

UNITED STATES PATENTS

| 2,728,225 | 12/1955 | Skibitzke | 73/204 |
| 3,246,515 | 4/1966 | Martino et al. | 73/204 |
| 3,595,079 | 7/1971 | Grahm | 73/204 |
| 3,630,080 | 12/1971 | Taylor | 73/343 |
| 3,691,833 | 9/1972 | Fijitake et al. | 73/204 |
| 3,742,476 | 6/1973 | Withrow | 73/204 |
| 3,800,592 | 4/1974 | Jones, Jr. | 73/204 |

FOREIGN PATENTS OR APPLICATIONS

| 1,238,716 | 7/1960 | France | 73/204 |
| 704,162 | 2/1954 | United Kingdom | 73/204 |

Primary Examiner—Herbert Goldstein
Attorney, Agent, or Firm—Robert K. Rhea

[57] ABSTRACT

A thermal type flowmeter comprising an elongated relatively small tubular probe, adapted to be inserted through a wall of a fluid containing vessel, contains an electrical resistance heater for heating the probe to a predetermined temperature. The electromotive force of a thermocouple, contained by the probe, indicates a voltage inversely related to the rate of heat dissipation from the probe to the surrounding fluid. With the temperature of the fluid being known or compensated for the rate of heat dissipation from the probe indicates the fluid flow rate.

8 Claims, 6 Drawing Figures

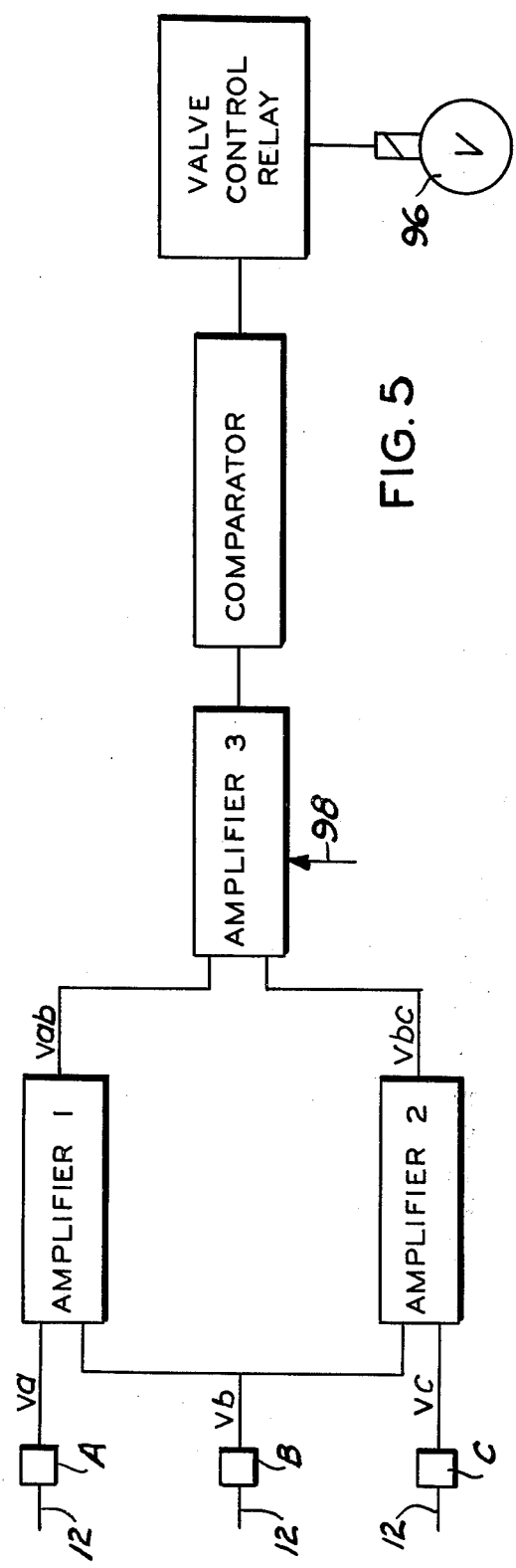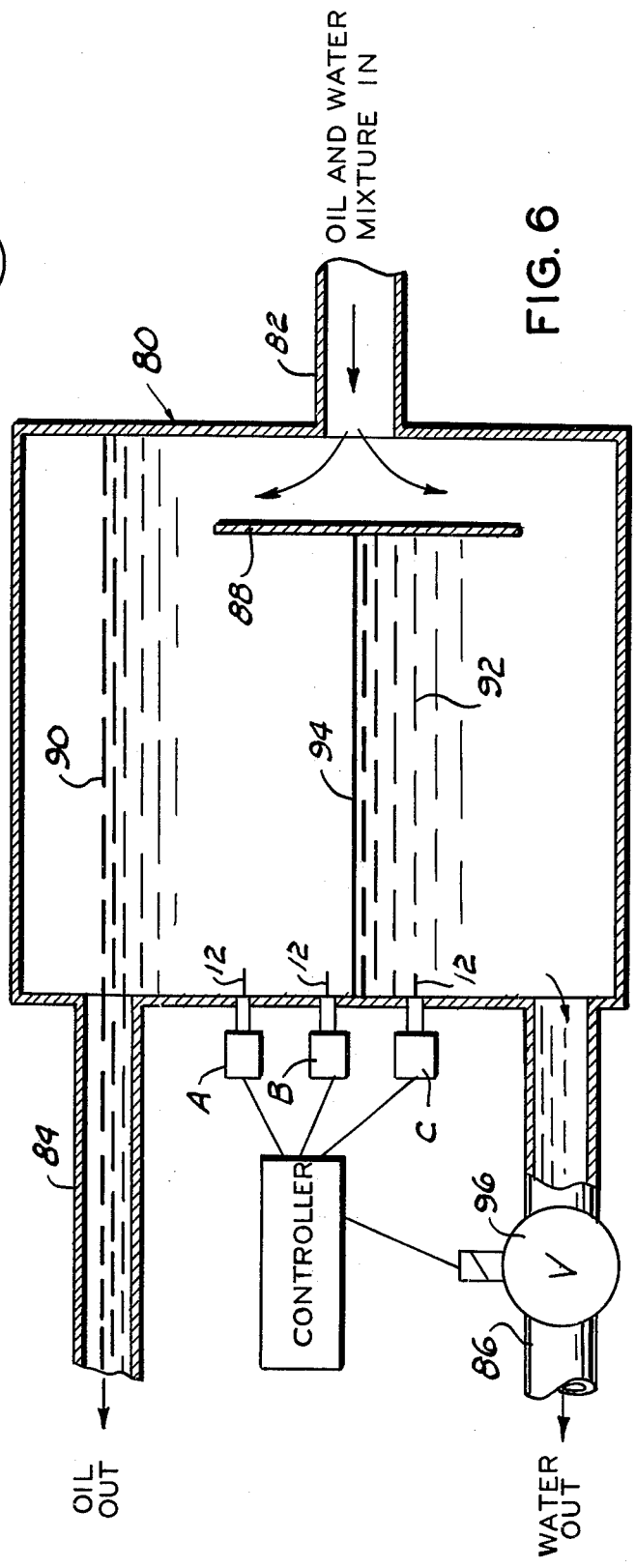

THERMAL GAUGE PROBE

BACKGROUND OF THE INVENTION

1. Field of the Invention

The present invention relates to flowmeters and more particularly to a thermal probe to be inserted into a fluid stream for measuring the flow rate.

In industrial applications where fluids are moved through conduits or containers it is essential that the flow rate be determined. It is desirable in determining flow rates that such measurement be obtained from selected locations in the flow path of the fluids and that the flow rate measuring apparatus may be easily inserted into and removed from the fluid stream at predetermined locations rather than being permanently fixed therein. Further, it is desirable that, in some instances, an interface between two liquids of different specific gravity be maintained between predetermined limits.

This invention accomplishes the desired portable features for a flowmeter by providing a relatively small probe-like device which may be manually inserted through a self-sealing probe receiving plug connected with the stream conductor without impeding the flow. The flow rate is determined by the rate of heat dissipation from the probe to the fluid stream.

2. Description of the Prior Art

Flow rate measuring devices presently in use generally have comprised a turbine type, target type, orifice or venturi type flowmeters. These devices usually contained some objectionable features, such as they are usually permanently installed or are sensitive to fluid temperature changes and obstruct flow of the fluid.

This invention eliminates at least some of the objectionable features of such flowmeters by providing a heated type flowmeter which is not permanently installed but is inserted through a vessel wall containing a stream of fluid when a measurement is desired and is removable therefrom. Further, since the diameter of the probe is relatively quite small, there is no appreciable amount of obstruction to fluid flow, the probe is easily inserted into vessels containing fluid under relatively high pressure.

SUMMARY OF THE INVENTION

This probe type flowmeter is used in combination with a plug-like adaptor permanently secured to the wall of a container for fluid wherein the plug is provided with a self-sealing central aperture which admits and seals with the probe and seals its central aperture fluid tight when the probe is withdrawn. The probe contains a resistance heater which is energized by a source of electrical energy to provide a heat source of a predetermined temperature at a given input wattage when the probe is disposed in a fluid stream. A thermocouple is disposed within the probe heater. This is important so that required wattage is less and sensitivity greater. With the predetermined heater wattage known the voltage output of the thermocouple is inversely proportionate to the heat loss to the fluid thus revealing the amount of mass flow rate of the fluid when the fluid temperature is known or is compensated for.

The principal objects of this invention are to provide a portable thermal probe type flowmeter for quickly determining flow rates and trouble shooting fluid applications and for maintaining the interface between two fluids within predetermined limits.

BRIEF DESCRIPTION OF THE DRAWINGS

FIG. 5 is a flow diagram; and

FIG. 6 is a diagrammatic view illustrating the manner of controlling the level of a liquid-liquid interface.

DESCRIPTION OF THE PREFERRED EMBODIMENTS

Figure 1:
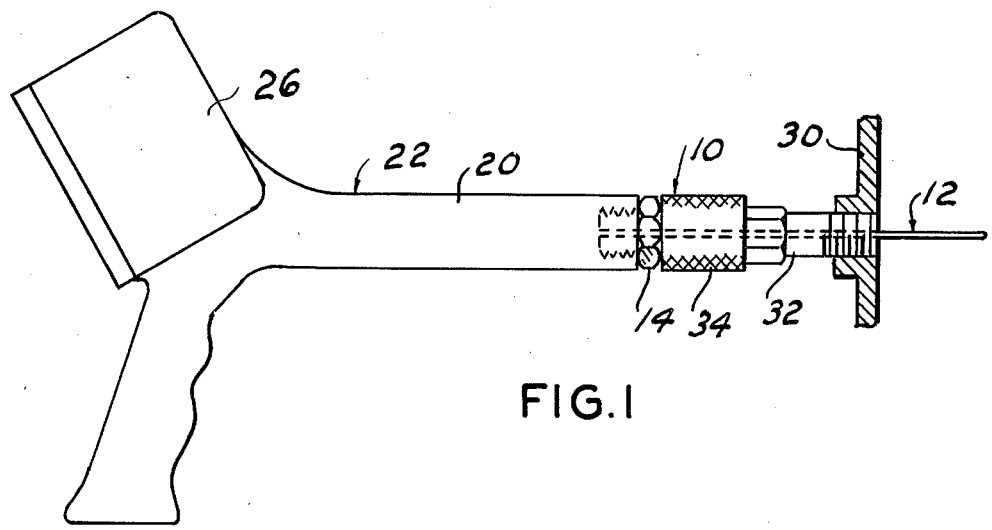
FIG. 1 is a side elevational view, partially in section, illustrating a thermal type probe inserted through the walls of a container.

Like characters of reference designate like parts in those figures of the drawings in which they occur.

Figure 2:
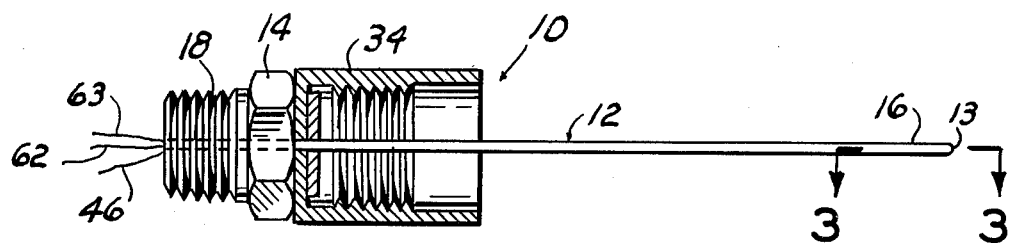
FIG. 2 is a side elevational view, partially in section, of the thermal probe, per se.

In the drawings:

Referring more particularly to FIGS. 1 and 2, the reference numeral 10 indicate a thermal gauge probe, as a whole, comprising an elongated tubular stem 12 having a closed end 13 and having its other end portion coaxially connected with a head 14. Diametrically the stem 12 is relatively small, not greater than ⅛ inch (3.25mm) in diameter. The length of the stem 12 is determined by the particular application, such as the cross sectional dimension of the vessel containing a stream of fluid with which it is to be used so that the inwardly disposed end projects a selected distance into the fluid being measured or controlled or the depth of a buried fluid conducting line. Probes 20 feet (6.1 meters) long are practical. The head 14 is provided with external threads 18 for connection with the stem 20 of a support housing 22.

The support housing 22 includes a handle 24 and a box-like instrument and/or battery containing portion 26. The support housing 22 is fully described in my U.S. Pat. No. 3,630,080 but forms no part of this invention other than to illustrate a support for the probe 10 and a means for inserting the probe into a vessel 30.

The wall of the vessel 30 is provided with a gauge plug 32, having a central self-sealing bore for the admission and removal of the probe stem 12, the plug 32 being similarly disclosed and described in my U.S. Pat. No. 3,630,080. The probe 10 is provided with a sleeve-like nut 34 having internal threads 36 for engagement with and maintaining the probe 10 connected with the probe admitting plug 32.

Figure 3:
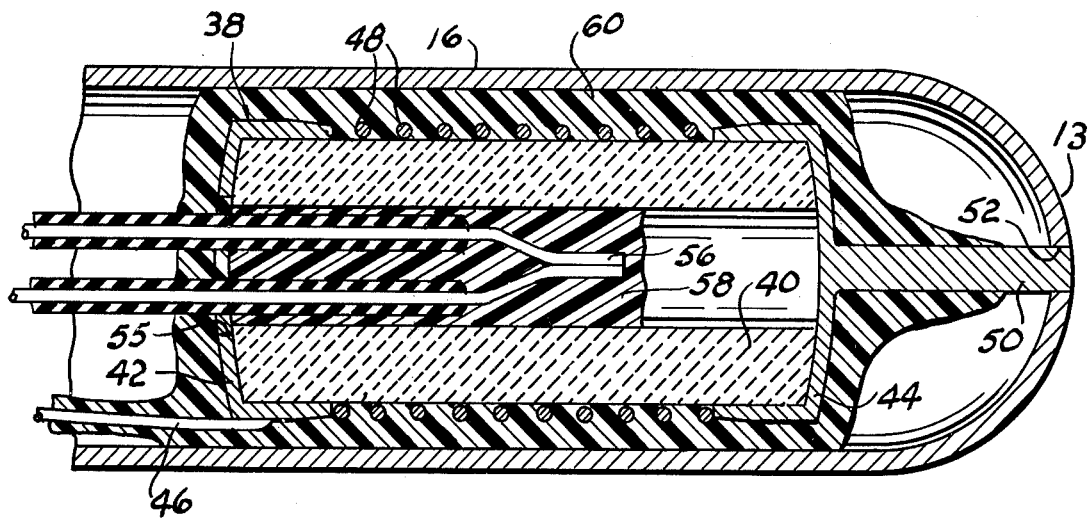
FIG. 3 is a fragmentary horizontal cross sectional view, to an enlarged scale, taken substantially along the line 3—3 of FIG. 2.

Referring also to FIG. 3, the probe end portion 16 contains a resistance heating element 38 comprising a tubular electrical insulating core 40, preferably formed of ceramic material, having its respective end portions covered by a metallic top cap 42 and a metallic bottom cap 44. An electrical current supply wire 46, extending through the head 14 and bore of the probe, is connected with the top cap 42. An electrical resistance wire 48 is connected at one end with the top cap 42 and helically wound around the periphery of the ceramic core 40 and connected at its other end with the bottom cap 44. The bottom cap 44 is coaxially provided with a prong 50 which projects through an aperture 52 in the closed end 13 of the stem 12 and is joined thereto, as by soldering, not shown, to form an electrical connection. The wall of the stem 12 forms an electrical ground.

A thermocouple 56 is inserted into the bore of the ceramic core 40 through a central opening 55 in the top cap 42 and is sealed therein by an electrical non-conductive ceramic cement material 58, presently marketed under the trade name Sauereisen. The heating element 38 is electrically insulated with respect to the inner wall surface of the stem 12 by a similar synthetic (plastic spray-on type) sealing thermal conductive material 60 marketed under the trade name Ryton, the lead wire 46 also being electrically insulated with the same material. The thermocouple leads 62 and 63 and current supply wire 46 extend through the probe head 14 for connection, respectively, with electrical instruments, as hereinafter explained, and a source of electrical energy, not shown.

In determining fluid flow rate, the thermal probe 10 is inserted through the gauge plug 32 transversely of the flow path of fluid in the vessel 30. Current is applied to the heating element 38 by the lead wire 46 and current return path 50 and 16 which heats the probe with a relatively constant wattage input. For example, power input of less than one watt at seven volts heats the probe stem 12 to 375° F.; power input of less than one watt at eight volts heats the probe stem 12 to a temperature of 470° F.; and power input of 1 watt at 12 volts results in a probe temperature of 750° F. in still air. The fluid temperature, if not known is measured by any suitable means or by using the temperature measuring gauge probe disclosed by my above referred to U.S. Pat. No. 3,630,080 or the temperature may be compensated for as presently explained. Since the wattage to the probe is fixed and known, equating the electromotive force supplied by the leads 62 and 63 of the thermocouple 56, being reduced by heat dissipation to the stream of fluid, with the known fluid temperature permits calculation of the mass flow rate which is given by the following equation:

$$\text{Flow rate} = \frac{EI}{K(T_{Probe} - T_{Fluid})}$$

where
 $EI$ = power delivered to the probe
 $K$ = system constant
 $T_{Probe} - T_{Fluid}$ = temperature difference of fluid and heated probe.

Figure 4:
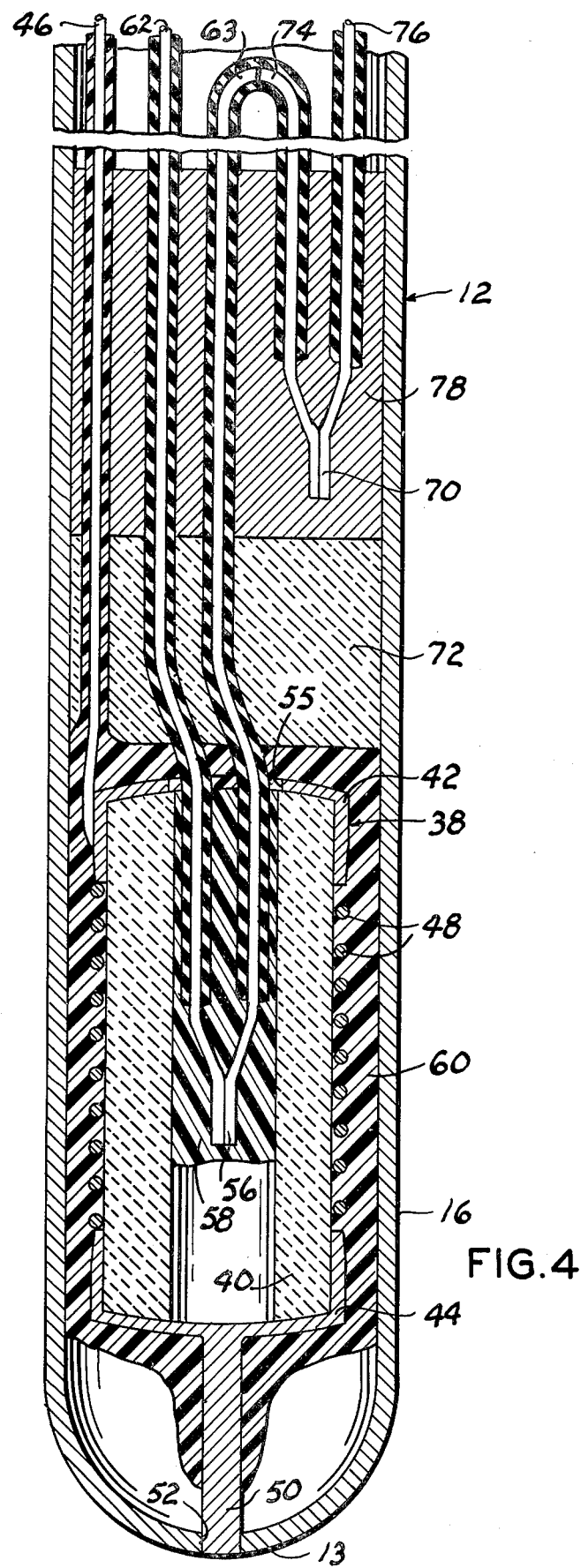
FIG. 4 is a view, similar to FIG. 3, illustrating another embodiment.

In some fluid applications the temperature of the fluid varies either up or down. Since the temperature of the fluid must be known to obtain its mass flow rate when using this thermal probe and it is usually impractical to constantly obtain the fluid temperature, a modified form of the probe is provided as illustrated in FIG. 4 and indicated generally by the reference numeral 12'. In this embodiment the closed end portion of the probe 12' contains identical components, as illustrated and described for FIG. 3 and are assigned the same reference numerals. The principal distinction between the probe 12 and 12' being the addition of a second thermocouple 70 contained by the tube end portion 16 and thermally insulated from the heater 38. The thermocouple 70 is disposed in spaced relation with respect to the thermocouple 56 toward the head 14. A section or layer of thermal insulating material, such as Sauereisen 72, forms a thermal barrier between the second thermocouple 70 and the heater 38. Heat dissipated to surrounding fluid from the heater through the probe wall end portion wall 16 does not directly affect the thermocouple 70 and at least reduces such influence to a minimum. The juncture of the thermocouple 70 and adjacent end portions of its lead wires 74 and 76 are surrounded by a layer of thermal conductive material, such as grease 78, presently known as Silicon grease, also surrounding an intermediate portion of the first thermocouple leads 62 and 63 and current source wire 46. The thermocouples 56 and 70 are connected in series by joining the leads 63 and 74 so that the other lead 62 of the thermocouple 56 and the lead 76 of the thermocouple 70 extend through the head 14 in the manner illustrated in FIG. 2 for the embodiment of FIG. 3. Thus, the electromotive forces, generated by heat at the junction of the leads of the thermocouple 5, is partially cancelled out by its connection with the thermocouple 70 so that the resulting electromotive force of the series connected thermocouples is a function of the heat dissipated from the heater 38 to the surrounding fluid and the changes in the fluid temperature acting on the wall of the probe surrounding the junction of the thermocouple 70 reducing the electromotive force of the thermocouple 70. Thus, it may be seen that the probe 12' is responsive to variations of the temperature of the surrounding fluid and provides a temperature read-out at any given time which similarly permits calculation of the mass flow rate of fluid by the above equation.

In addition to determining flow rates by the dissipation of heat from the probe to a moving fluid, the probe is also effective in controlling fluid levels and interface levels by using a plurality of the probes 10.

Referring also to FIGS. 5 and 6, the reference numeral 80 indicates a fluid containing settling chamber, or the like, having an inlet tube 82 and outlet tubes 84 and 86 arranged in vertically spaced relation.

Assuming that the fluid to be controlled within the chamber 80 is a mixture of fluids having different specific gravity, such as a mixture of oil and water, the mixture enters the chamber 80 through the tube 82. A baffel 88 is provided within the chamber 80 adjacent the inlet 82 to prevent oil and water, when settled-out or separated, from comingling as a result of inlet flow. The oil, indicated at 90 and water indicated at 92, forms an interface indicated by the line 94. The oil 90 normally flows out of the outlet pipe 84 and the water flows out through the outlet pipe 86. In such a settling tank it is necessary that the interface 94 be maintained between the limits defined by the upper limit of the water outlet pipe 86 and lower limit of the oil outlet pipe 84 for obvious reasons.

Control of the interface 94 may be accomplished by interposing a solenoid operated control valve 96 in the water outlet line 86 and positioning three of the thermal probes in vertically spaced relation, as indicated by the letters A, B and C (FIG. 6), so that the respective probe stem 12 or 12' projects into the fluid within the chamber 80 and defines upper and lower limits for the interface 94. The heating elements 38 of the respective probes A, B and C are heated in the manner disclosed hereinabove and the electromotive force of the respective thermocouple or thermocouples is hereinafter referred to as "voltages" from the probes A, B and C.

Referring more particularly to FIG. 5, voltages from probes A and B are fed to an amplifier 1. Voltages from probes B and C are fed to an amplifier 2. Since all three probes are identical, the voltage output difference, from the respective thermocouples, will result from the fact that the thermal conductivity of the two fluids is different. With a fixed voltage on each heater 38, the thermocouple voltage output of all probes in either medium is the same. The thermal conductivity of the oil 90 is less than the water 92. If probes A and B are immersed in oil and probe C in water, probe C will lose heat faster and the output from its thermocouple $Vc$ will be lower. Voltages from probes A and B, $Va$ and $Vb$, respectively, will be equal and higher than the voltage from $Vc$. Voltages $Va$ and $Vb$ are applied to the amplifier 1 but since they cancel each other $Vab=0$. Voltages $Vb$ and $Vc$ are applied to the amplifier 2. Since they are different (below a reference voltage) $Vbc$ is applied to an amplifier 3. An amplified voltage below the reference voltage goes to a comparator. The comparator then activates a valve control relay when the voltage $Vbc$ is sufficiently below the reference voltage 98. The valve control relay closes the valve 96 to stop water draining from the tank 80 to raise the interface 92.

As the water rises above probe B, voltage $Vb$ falls until it is close in value to voltage $Vc$. This is because probe B loses heat to the water at a more rapid rate than it did in oil thus decreasing the output of the thermocouple probe B. Voltages $Va$ and $Vb$ are applied to the amplifier 1. The voltages are now different and this difference $Vab$ is fed to the amplifier 3. Voltages $Vb$ and $Vc$ are fed to the amplifier 2, but since the voltages are now equal they cancel and $Vbc=0$. The output from amplifier 3 is now above the reference voltage. The comparator determines that this voltage is sufficiently above the reference voltage and it sends a signal to the valve 96 to open it. This prevents the level of the interface 94 from increasing further. As water 92 again lowers in the tank 80 the interface 94 will fall until it is again below the probe B. Voltage $Vb$ will increase and the control cycle will be repeated.

Obviously the invention is susceptible to changes or alterations without defeating its practibility. Therefore, I do not wish to be confined to the preferred embodiment shown in the drawings and described herein.

I claim:

1. A thermal gauge probe, comprising:
   an elongated tubular stem having a closed end portion,
   said stem being adapted to be inserted at its closed end portion into a fluid stream contained by a wall;
   a resistance heater coil axially disposed within said stem and connected with a source of electrical energy supplying a constant voltage of preselected value to said heater coil;
   a thermocouple within said stem and having its junction axially disposed within said resistance heater coil; and
   tubelike electrical nonconducting material surrounding the thermocouple junction and supporting said heater coil in spaced relation with respect to the inner wall surface of said stem,
   whereby the electromotive force generated by said thermocouple in response to the temperature of said heater coil is inversely proportional to the rate of heat dissipation from the outer surface area of said stem to the surrounding fluid.

2. The gauge probe according to claim 1 in which the diameter of said stem is less than ⅛ inch (3.25mm).

3. The gauge probe according to claim 2 and further including:
   a second thermocouple within said stem and connected in series with the first said thermocouple for sensing temperature changes in the surrounding fluid,
   said second thermocouple having its junction disposed in spaced relation with respect to said resistance heater toward the other end portion of said stem; and,
   a layer of thermal insulating material interposed between said resistance heater and said second thermocouple.

4. In combination with
   a gauge plug adapted to be secured to the wall of a fluid container and closing an opening therein,
   said gauge plug having a self-sealing opening providing a path for communication with the interior of the fluid container through the gauge plug and container wall, the improvement comprising:
   an elongated tubular stem having a closed end portion slidably received, longitudinally, by the gauge plug opening;
   a resistance heater coil axially disposed within said stem and connected with a source of electrical energy supplying a constant voltage of preselected value to said heater coil;
   a thermocouple within said stem and having its junction axially disposed within said resistance heater coil; and,
   tubelike elecrical nonconducting material surrounding the thermocouple junction and supporting said heater coil in spaced relation with respect to the inner wall surface of said stem,
   whereby the electromotive force generated by said thermocouple in response to the temperature of said heater coil is inversely proportional to the rate of heat dissipation from the outer surface area of said stem to the surrounding fluid.

5. The combination according to claim 4 in which the diameter of said stem is not greater than ⅛ (3.25mm).

6. The combination according to claim 5 in which said stem is provided with means including a threaded member for connection with said gauge plug.

7. The combination according to claim 6 and further including:
   a second thermocouple within said stem and connected in series with the first said thermocouple for sensing temperature changes in the surrounding fluid,
   said second thermocouple having its junction disposed in spaced relation with respect to said resistance heater toward the other end portion of said stem; and,
   a layer of thermal insulating material interposed between said resistance heater and said second thermocouple.

8. The combination according to claim 7 and further including:
   handle means connected with said stem for moving said stem through said gauge plug.

* * * * *